United States Patent
Williams et al.

[11] Patent Number: 5,715,119
[45] Date of Patent: Feb. 3, 1998

[54] ROTATING CRASH STOP ASSEMBLY FOR HARD DISK DRIVES

[75] Inventors: Kelly Williams, Brentwood; Tho Pham, Milpitas, both of Calif.

[73] Assignee: Samsung Electronics, Inc., Richfield Park, N.J.

[21] Appl. No.: 660,125

[22] Filed: Jun. 7, 1996

[51] Int. Cl.$^6$ ............................................. G11B 5/54
[52] U.S. Cl. ............................................. 360/105
[58] Field of Search .................... 360/105, 97.01, 360/86; 369/215, 222; 384/428

[56] References Cited

U.S. PATENT DOCUMENTS

| | | | |
|---|---|---|---|
| 4,110,802 | 8/1978 | Ho et al. | 360/106 |
| 4,949,206 | 8/1990 | Phillips et al. | 360/106 |
| 5,262,913 | 11/1993 | Stram et al. | 360/105 |
| 5,293,282 | 3/1994 | Squires et al. | 360/97.03 |
| 5,365,389 | 11/1994 | Jabbari et al. | 360/105 |
| 5,369,538 | 11/1994 | Moe et al. | 360/105 |
| 5,402,290 | 3/1995 | Daniel | 360/105 |

FOREIGN PATENT DOCUMENTS 2100052  12/1982  United Kingdom ............ 360/105

*Primary Examiner*—Craig A. Renner
*Attorney, Agent, or Firm*—Blakely Sokoloff; Taylor & Zafman

[57] ABSTRACT

A crash stop is used for an actuator arm of a hard disk drive. The crash stop includes a base portion that is pivotally connected to a post that separates the magnets of a voice coil motor. Extending from the base portion is a tab portion that can be rotated between a first position and a second position. When in the second position the tab limits the movement of the actuator arm so that the sliders of the disk drive cannot move off of the disks. The actuator arm, voice coil motor and crash stop can be installed by initially placing the crash stop in the first position and orienting the actuator arm in an off disk position. The actuator arm and voice coil motor are then mounted to a base plate of the disk drive. The actuator arm is rotated to load the magnetic heads onto the disks of the disk drive. The crash stop is then rotated to the second position and a cover is subsequently attached to the base plate to enclose the assembly.

7 Claims, 2 Drawing Sheets

ROTATING CRASH STOP ASSEMBLY FOR HARD DISK DRIVES

BACKGROUND OF THE INVENTION

1. Field of the Invention

The present invention relates to a crash stop for an actuator arm of a hard disk drive.

2. Description of Related Art

Hard disk drives contain magnetic transducers that are coupled to rotating magnetic disks. The transducers can magnetize and sense the magnetic field of the disks. The transducers are integrated into sliders that are each mounted to a flexure arm. The flexure arms are attached to an actuator arm. The actuator arm has a voice coil that is coupled to a pair of magnets that are mounted to the base plate of the drive. The coil and magnets are commonly referred to as a voice coil motor. Energizing the voice coil rotates the actuator arm and moves the sliders across the disks.

Hard disk drives are typically installed into a computer assembly which may be subjected to external shock and vibration loads. The shock loads may move the sliders off of the disks. The sliders may become damaged if the actuator arm rotates the sliders into another structure such as the housing of the disk drive. To minimize component damage many disk drives contain crash stops which impede the movement of the actuator arm and prevent the sliders from moving off of the disks.

Hard disk drives are typically assembled by mounting the actuator arm and the voice coil motor onto a base plate after the disks are mounted to the spin motor of the drive. The actuator arm must be installed in an "off-disk" position so that the sliders clear the disk assembly. The sliders are loaded onto the disks by rotating the actuator arm.

Crash stops of the prior art prevent the actuator arm from being assembled in the off-disk position. For this reason the crash stop must either be assembled to the drive after the actuator arm and voice coil motor are mounted to the base plate, or the voice coil motor must be assembled to the drive in separate halves.

The crash stop must be positioned very accurately within the disk drive. Installing the crash stop after the voice coil motor is mounted to the base plate is undesirable because of the additional dimensional tolerances in the assembly. The additional tolerances must be compensated by reducing the individual tolerances of the drive components, particularly the base plate. The smaller tolerances increase the cost of producing the disk drive.

Assembling the voice coil motor in separate halves also has disadvantageous. The attractive force of the voice coil magnets can be over 200 pounds. The sliders are typically loaded onto the disks before the top magnet is mounted to the drive. The magnets must be separated while gently mounting the top magnet to prevent any movement in the drive which may cause the sliders to strike the disks. Such an assembly process requires relatively sophisticated tooling.

Additionally, the magnets are typically shipped and provided as a pair, so that the magnets can be accurately tested and to prevent any de-gaussing of the magnetic material. The attractive force of the magnets may cause the magnets to suddenly jump together at a bench. The movement of the magnets may injure an operator and/or damage the magnetic plates. The sudden impact of the magnets may also introduce contaminants into the clean room. Removal of the contaminants may require shutting down the assembly station, a particularly undesirable event for a hard disk manufacturer. It would be desirable to provide a crash stop that would allow the voice coil motor and actuator arm to be assembled to a disk drive as complete subassemblies.

SUMMARY OF THE INVENTION

The present invention is a crash stop for an actuator arm of a hard disk drive. The crash stop includes a base portion that is pivotally connected to a post that separates the magnets of a voice coil motor. Extending from the base portion is a tab portion that can be rotated between a first position and a second position. When in the second position the tab limits the movement of the actuator arm so that the sliders of the disk drive cannot move off of the disks. The actuator arm, voice coil motor and crash stop can be installed by initially placing the crash stop in the first position and orienting the actuator arm in an off disk position. The actuator arm and voice coil motor are then mounted to a base plate of the disk drive. The actuator arm is rotated to load the magnetic heads onto the disks of the disk drive. The crash stop is then rotated to the second position and a cover is subsequently attached to the base plate to enclose the assembly.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
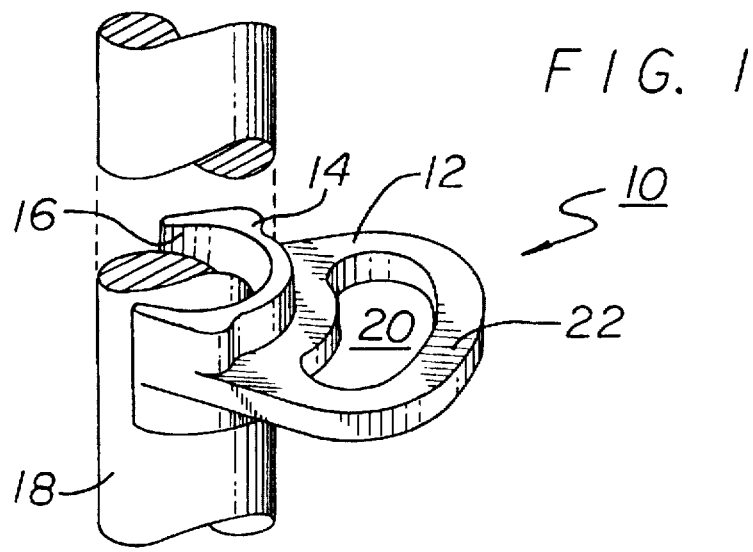
FIG. 1 is a perspective view of crash stop of the present invention.

Referring to the drawings more particularly by reference numbers, FIG. 1 shows a crash stop 10 of the present invention. The crash stop 10 limits the movement of an actuator arm of a hard disk drive and typically prevents the sliders of the disk drive from moving off of the disks. The crash stop 10 has a tab 12 that extends from a base 14. The base 14 is preferably constructed to have a bearing surface 16 that is shaped as a segment of a cylinder. Although a segment of a cylinder is shown and described, it is to be understood that the bearing surface 16 may have other shapes.

The bearing surface 16 preferably has a radius that is approximately equal to a radius of a post 18 which separates the magnets of a voice coil motor, so that the crash stop 10 can be attached to the post 18 with an interference fit. The interference fit allows the crash stop 10 to be rotated about the post 18 between a first position and second position. The interference fit also creates a friction force which maintains the position of the crash stop 10. When in the second position the crash stop 10 limits the movement of an actuator arm.

The crash stop 10 is preferably constructed from a molded plastic material that will absorb the shock applied by an actuator arm engaging the crash stop 10. The tab 12 preferably has an opening 20 which reduces the stiffness of the tab 12 so that the stop 10 can more readily dampen the shock force of the actuator arm. Extending around the opening 20 is a ring portion 22. The ring portion 22 is supported at both ends to increase the structural integrity of the tab 12 so that the crash stop 10 can withstand the shock loads of the actuator arm. The opening 20 preferably has a curved shaped to reduce the stress points within the crash stop 10. Likewise the ring portion 22 is preferably curved to reduce the stress points and eliminate sharp corners which may injure an operator handling the stop 10.

Figure 2:
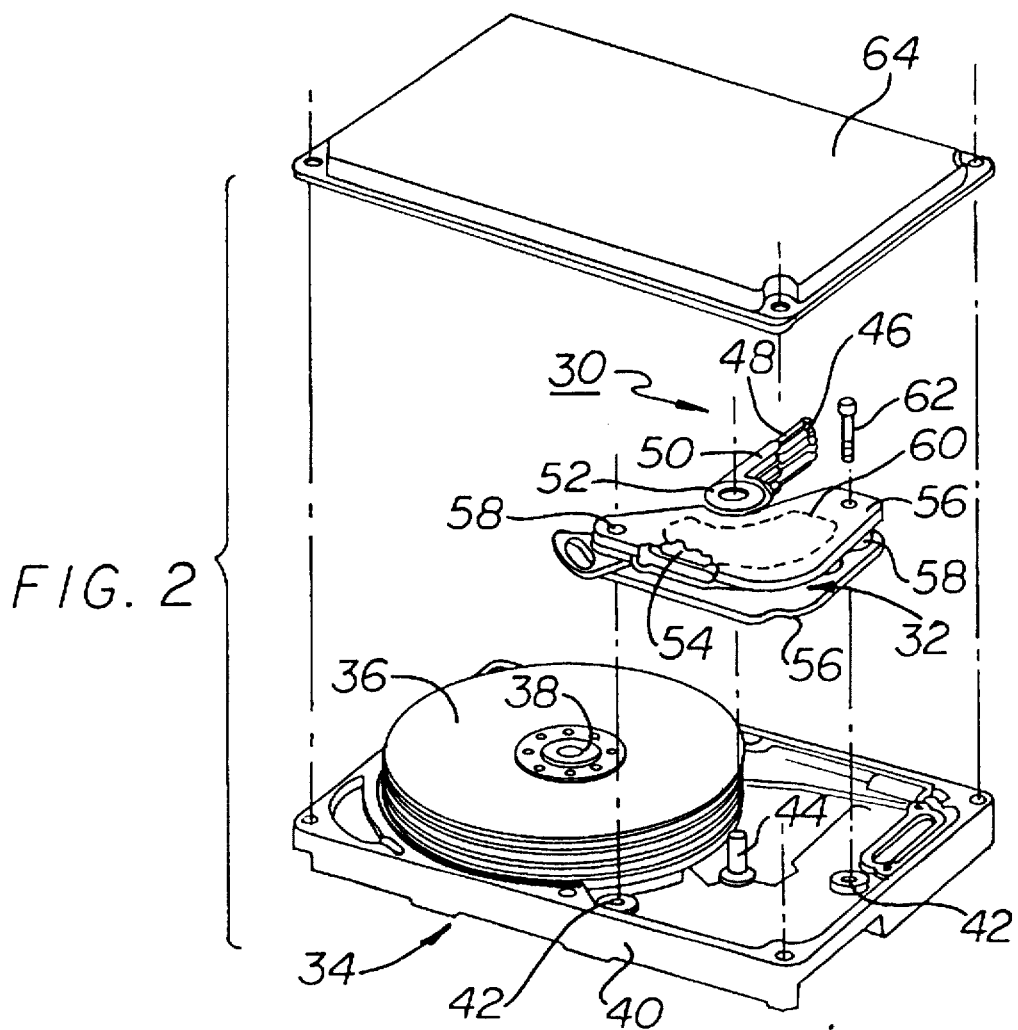
FIG. 2 is a perspective view showing an actuator arm and a voice coil motor being assembled onto a hard disk drive base plate.
Figure 3:
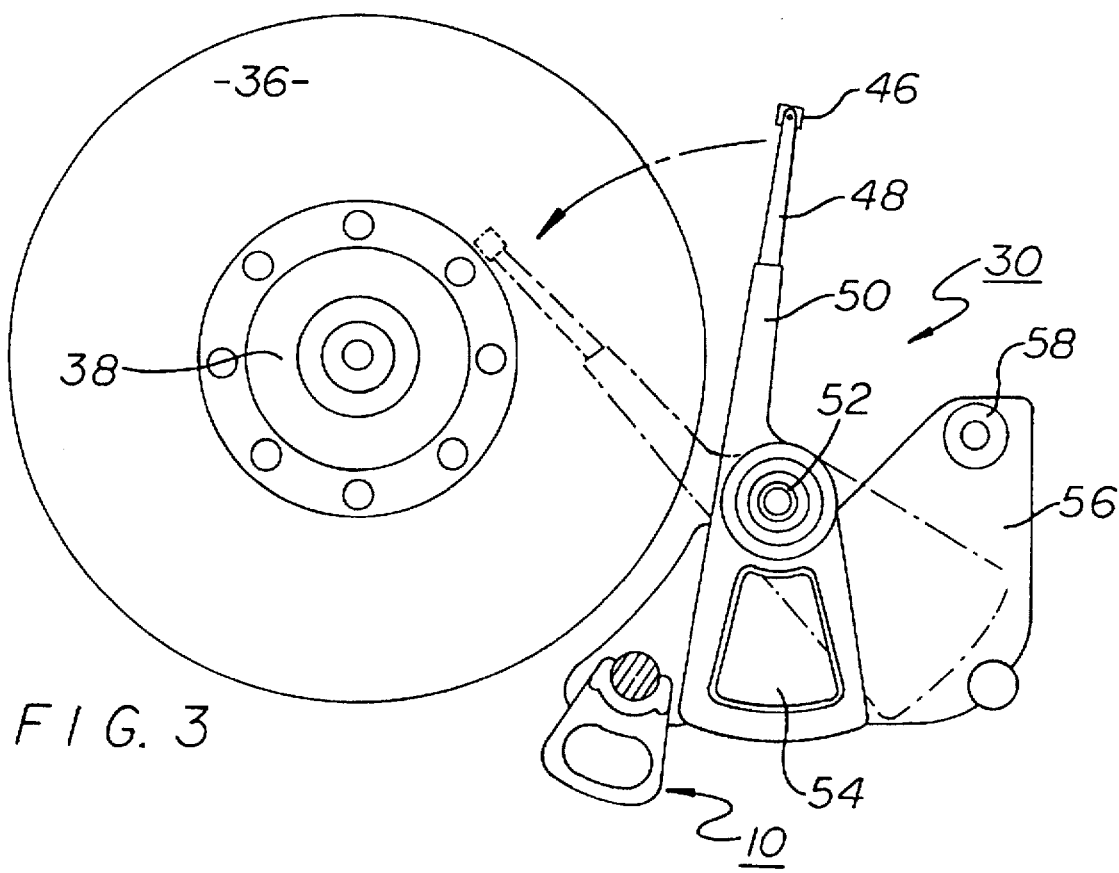
FIG. 3 is a top view showing the sliders of the actuator arm loaded onto the disks.
Figure 4:
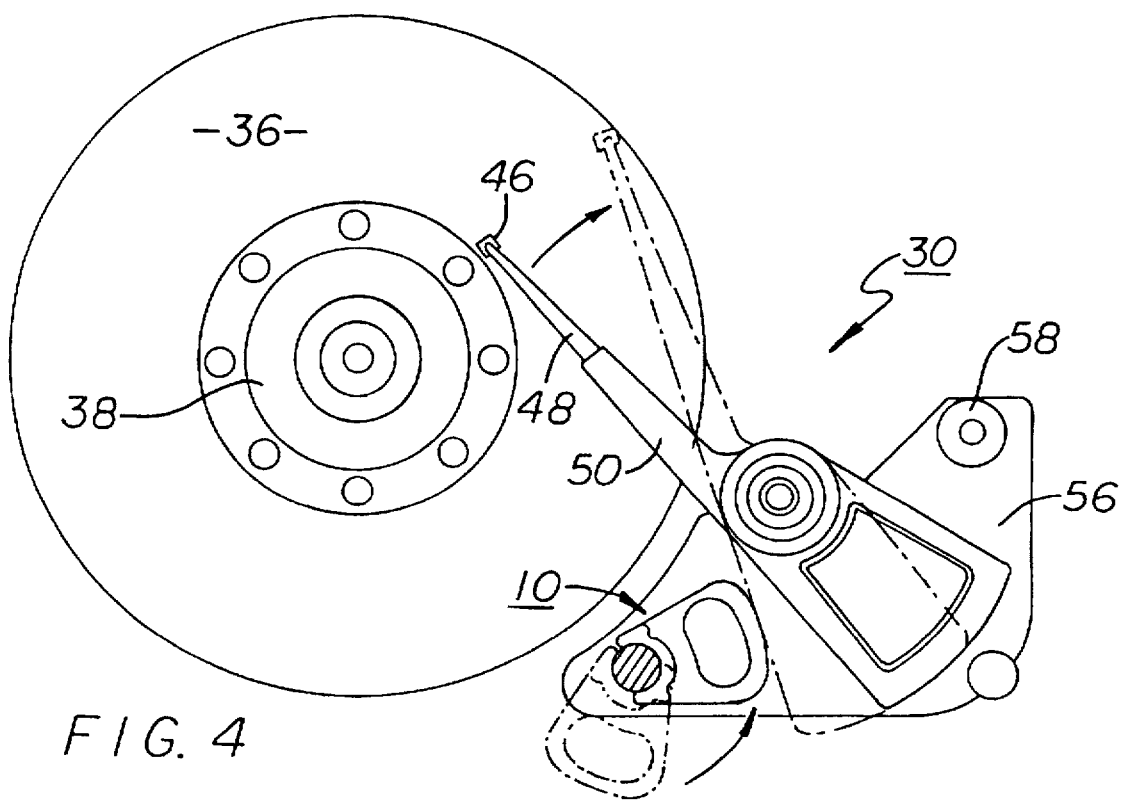
FIG. 4 is a top view showing the crash stop rotated to a second position.

FIGS. 2-4 show a process for installing an actuator arm assembly 30 and a voice coil motor assembly 32 into a disk drive assembly 34. The disk assembly 34 includes a plurality of disks 36 that are clamped onto a spin motor 38. The spin motor 38 is mounted to a base plate 40. The base plate 40 has a pair of threaded apertures 42 for mounting the voice coil motor assembly 32 and a boss 44 for installing the actuator arm assembly 30.

The actuator arm assembly 30 includes a plurality of sliders 46 that are mounted to flexure arms 48. The flexure arms 48 are attached to an actuator arm 50. The actuator arm 50 pivots about a bearing assembly 52 that is attached to the boss 44 of the base plate 40. Attached to the end of the actuator arm 50 is a voice coil 54.

The voice coil motor assembly 32 includes a pair of plates 56 that are separated by posts 58. Each plate 56 supports a magnet 60. The voice coil 54 is located between the plates 56 and coupled to the magnets 60. The actuator arm 50 will rotate about the bearing 52 and move the sliders 46 across the disks 36 when a current is provided to the coil 54. The crash stop 10 is attached to one of the post 58 of the assembly 32. The crash stop 10 is typically attached to the post 58 before the top plate 56 is attached to the bottom plate 56 of the voice coil motor assembly 32.

To assemble the drive, the spin motor 38 and disks 36 are initially mounted to the base plate 40. The voice coil motor 32 is provided as a complete subassembly with the crash stop 10 attached to the post 58. The actuator arm assembly 30 is attached to the boss 44 and the voice coil motor assembly 32 is mounted to the base plate 40 by screws 62. The crash stop 10 is initially moved to the first position so that the actuator arm assembly 30 can be mounted in a position where the sliders 46 will not interfere with the disks 36.

As shown in FIG. 3, the actuator arm 50 is then rotated to load the sliders 46 onto the disks 36. The crash stop 10 is then rotated to the second position shown in FIG. 4. The position of the crash stop 10 limits the movement of the actuator arm 50 so that the sliders 46 can not move off of the disks 36. Referring to FIG. 2, cover plate 64 is eventually attached to the base plate 40 to enclose the drive. The cover plate 64 prevents the crash stop 10 from rotating back to the first position. The friction forces created by the interference fit of the crash stop 10 also prevent the stop 10 from rotating out of position. What is thus provided is a low cost crash stop that allows the voice coil motor and actuator arm to be mounted to a disk drive as complete subassemblies, thereby reducing the complexity and cost of assembling a hard disk drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A crash stop for an actuator arm of a hard disk drive, wherein the hard disk drive has a post, comprising:

a base that is pivotally connected to the post by a C-shaped bearing surface that clips onto the post; and, a tab that extends from said base, said tab having a ring portion that extends about an opening in said tab.

2. The crash stop as recited in claim 1, wherein said base has said bearing surface, which is shaped as a segment of a cylinder.

3. A hard disk drive, comprising:

a base plate;

a spin motor mounted to said base plate;

a disk mounted to said spin motor;

an actuator arm mounted to said base plate;

a slider that is attached to said actuator arm and coupled to said disk;

a voice coil attached to said actuator arm;

a pair of magnets that are mounted to said base plate and coupled to said voice coil;

a post that separates said magnets; and, a crash stop that is pivotally connected to said post by a C-shaped bearing surface that clips onto the post.

4. The hard disk drive as recited in claim 3, wherein said crash stop includes a tab that extends from a base.

5. The crash stop as recited in claim 4, wherein said tab has an opening.

6. The crash stop as recited in claim 5, wherein said tab has a ring portion that extends about said opening.

7. The crash stop as recited in claim 6, wherein said base has said bearing surface, which is shaped as a segment of a cylinder.

* * * * *